United States Patent
Park et al.

(10) Patent No.: US 7,330,595 B2
(45) Date of Patent: Feb. 12, 2008

(54) SYSTEM AND METHOD FOR VIDEO DATA COMPRESSION

(75) Inventors: Hyun-sang Park, Chonan (KR); Jung-hee Choi, Yongin (KR); Tae-hwan Park, Gyeongsanbuk-do (KR)

(73) Assignee: Samsung Electronics Co., Ltd. (KR)

( * ) Notice: Subject to any disclaimer, the term of this patent is extended or adjusted under 35 U.S.C. 154(b) by 891 days.

(21) Appl. No.: 10/649,556

(22) Filed: Aug. 26, 2003

(65) Prior Publication Data

US 2004/0146213 A1 Jul. 29, 2004

(30) Foreign Application Priority Data

Jan. 29, 2003 (KR) .................. 10-2003-0005839

(51) Int. Cl.
*G06K 9/36* (2006.01)
(52) U.S. Cl. .................. 382/236; 348/403.1; 348/699; 375/240.03; 375/240.16; 375/240.18; 375/240.24; 382/248; 382/251
(58) Field of Classification Search ............ 348/403.1, 348/699, 407.1; 375/240.01, 240.03, 240.04, 375/240.15, 240.16, 240.24, 240.18; 382/232, 382/234, 236, 248, 251
See application file for complete search history.

(56) References Cited

U.S. PATENT DOCUMENTS

| | | | | |
|---|---|---|---|---|
| 5,717,463 A | * | 2/1998 | Brailean et al. | 375/240.12 |
| 5,786,856 A | * | 7/1998 | Hall et al. | 348/403.1 |
| 5,812,199 A | * | 9/1998 | Lu et al. | 375/240.16 |
| 6,310,962 B1 | * | 10/2001 | Chung et al. | 382/100 |
| 6,393,060 B1 | * | 5/2002 | Jeong | 375/240.19 |
| 6,625,216 B1 | * | 9/2003 | Zhu | 375/240.16 |
| 6,697,427 B1 | * | 2/2004 | Kurak et al. | 375/240.03 |
| 6,788,740 B1 | * | 9/2004 | van der Schaar et al. | .. 375/240 |
| 2004/0146213 A1 | * | 7/2004 | Park et al. | 382/236 |
| 2004/0184543 A1 | * | 9/2004 | Haskell et al. | 375/240.16 |
| 2004/0233986 A1 | * | 11/2004 | Morad et al. | 375/240.12 |
| 2005/0243917 A1 | * | 11/2005 | Lee | 375/240.03 |
| 2007/0009030 A1 | * | 1/2007 | Song | 375/240.12 |
| 2007/0092006 A1 | * | 4/2007 | Malayath | 375/240.16 |

FOREIGN PATENT DOCUMENTS

| KR | 10-0288142 | 2/2001 |
|---|---|---|
| KR | 10-0333745 | 4/2002 |
| WO | WO 00/27123 | 5/2000 |

OTHER PUBLICATIONS

Takahashi, Masafumi, et al., "A 60mW MPEG4 Video Codec Using Clustered Voltage Scaling with Variable Supply-Voltage Scheme," ISSCC98/Session 2/ Video and Multimedia Signal Processing/ Paper TP 2.4, Feb. 5, 1998.
Tsuyoshi, Nishikawa, et al., "A 60 MHz 240mW MPEG-4 Video-Phone LSI with 16Mb Embedded DRAM," ISSCC 2000/ Session 14/ Signal Processing for Multimedia/ Paper TP 14.1, Feb. 8, 2000, pp. 230, 231 and 460.

* cited by examiner

*Primary Examiner*—Gregory M Desire
(74) *Attorney, Agent, or Firm*—Mills & Onello LLP (57) ABSTRACT

A system and method perform video data compression in a manner that limits the need for external memory access. Accordingly, the operational frequency of the local data bus is reduced and power consumption is therefore minimized. In this manner, the present invention is especially amenable to use in mobile systems.

71 Claims, 6 Drawing Sheets

(PRIOR ART)

SYSTEM AND METHOD FOR VIDEO DATA COMPRESSION

RELATED APPLICATIONS

This application claims priority from Korean Patent Application No. 2003-5839 filed on Jan. 29, 2003, the disclosure of which is incorporated herein in its entirety by reference.

FIELD OF THE INVENTION

The present invention is related to a system and method for video data compression, and in particular, to a system and method for video data compression that are especially amenable to use in a mobile system.

BACKGROUND OF THE INVENTION

During the compression of video data, for example using the MPEG2, MPEG4 or H.263 video compression standards, a video data compressor stores and retrieves current video frame data and reconstructed, i.e. previous, video frame data to and from an external memory device. In one example, the external device is referred to as a "frame memory", and takes the form of an SDRAM device. Transfer of data from and to the external frame memory in this manner consumes a relatively large amount of power in mobile systems.

Figure 1:
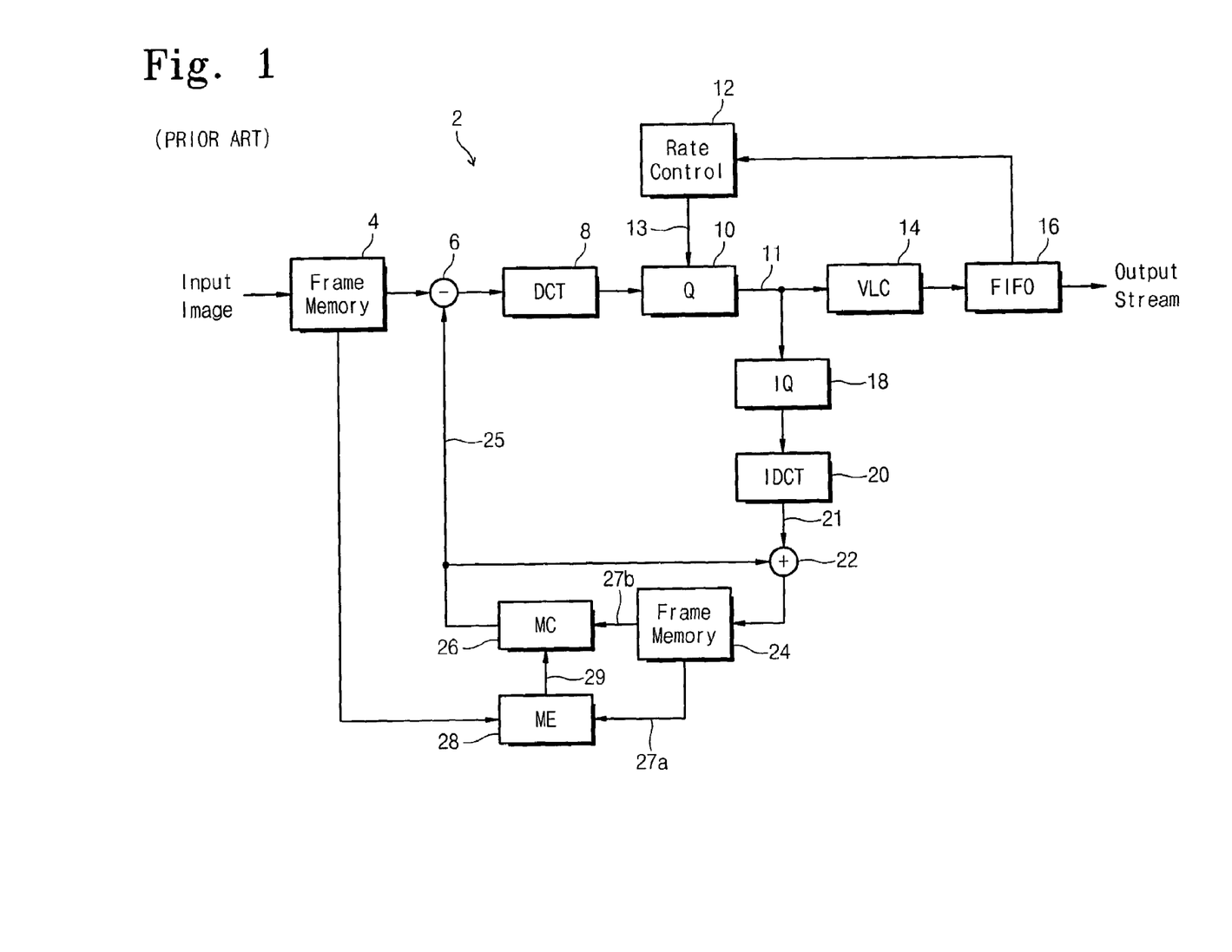
FIG. 1 is a functional block diagram of a conventional video data compressor.

A conventional video data compressor system 2 is shown in the block diagram of FIG. 1. As an input, the system 2 receives an input image frame in the form of data, referred to herein as a "current frame" or "current video data". The current frame is stored in a frame memory 4 unit.

The system 2 processes video frames according to the mode of operation. When a drastic change between two sequential images is detected, the system operates in an "intra-mode". When in intra-mode, the operation of motion compensation is not performed. When a subtle change between two sequential images is detected, the system operates in an "inter-mode". When in inter-mode, the operations of motion compensation and motion estimation are performed.

Assuming the inter-mode of operation, a motion estimation block ME 28 compares the current frame stored in frame memory 4 to a reconstructed previous video frame 27a, referred to herein as a "reference video frame", also stored in frame memory 24, and, as a result of the comparison, generates and outputs a motion vector 29 to a motion compensation block 26. The motion compensation block 26 applies the motion vector 29 to the reference frame 27b and generates a compensated video frame 25. A subtraction circuit 6 calculates the difference in value between the current video frame stored in frame memory 4 and the compensated video frame 25. The difference is applied to a discrete cosine transform circuit DCT 8, where it is converted from the spatial domain to the frequency domain, and the output of the DCT 8 is quantized at quantization block Q 10. The quantized output 11 is coded at a variable length coding circuit VLC 14 in order to statistically reduce the amount of output data. The coded bit stream output from the VLC 14 is stored in an output buffer FIFO 16, from which it is output as an output stream to a receiving apparatus or channel. Rate control circuit 12 provides a quantization rate control signal to the quantization block Q 10 that is applied for the quantization of the following video frame based on the number of the bit streams in the FIFO 16, in order to prevent the FIFO 16 from overflow or underflow.

At the same time, the quantized output 11 of the quantization block Q 10 enters a decoding procedure. The quantized output 11, in the form of quantized coefficients, are inversely quantized at an inverse quantization block IQ 18 and inverse discrete cosine transformed at an inverse discrete cosine transform block IDCT 20, and thus converted back to the spatial domain. The output 21 of the IDCT 20 takes the form of differential image signals having a quantized loss between the current video frame and the reference video frame. The output 21 is added to the compensated video frame 25 at a composer 22. The composer 22 output, i.e. the reference video frame, 27a, 27b, is stored in the frame memory 24. The reference video frame is used for the compression of the next received current video frame.

Note that while the above description refers to the compression of video data in the form of video "frames", the systems described herein apply equally well to entire frames of video data as well as segments, or "blocks" or "macro blocks" of video frames. The terms "video data", and "video frames" as used herein, are therefore applicable to, and include, both entire frames of data or segments, blocks, or macro blocks of video data frames.

As an example, the motion estimator ME 28, in its operation to determine the best match of the current frame with the previous frame operates exclusively on the luminance macro block of the video frame. The motion compensation function MC 26 operates on the luminance macro block and chrominance macro block of the video frame.

Figure 2:
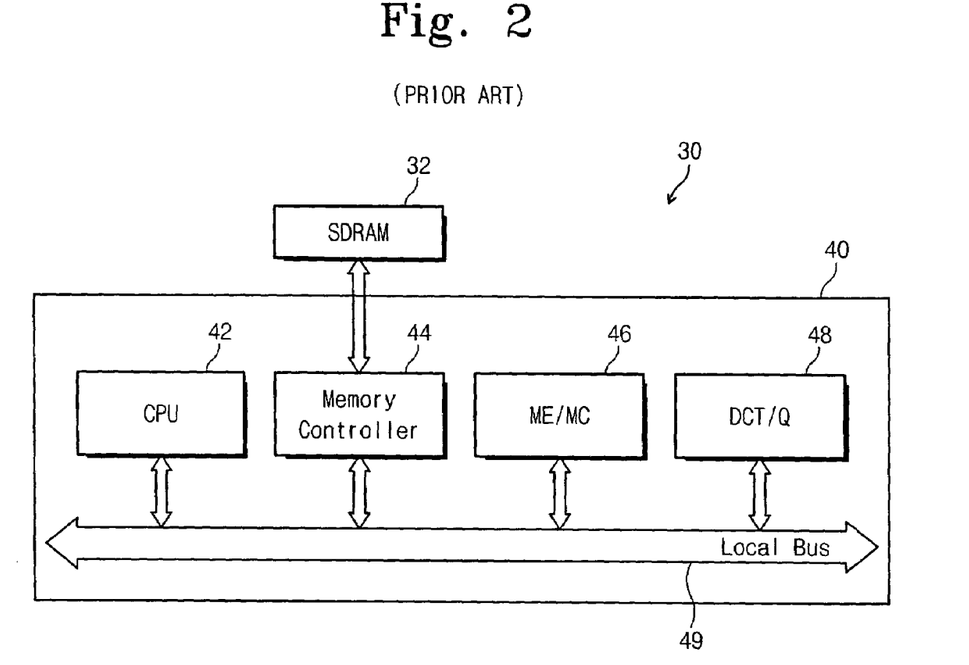
FIG. 2 is a block diagram of a conventional mobile system including the video data compressor of FIG. 1.

FIG. 2 illustrates a conventional mobile system 30 including a conventional video data compressor 40. The video data compressor 40 is constructed in a single integrated circuit, referred to as a system on a chip (SOC) circuit. The video data compressor 40 comprises a central processing unit CPU 42, a memory controller 44, a motion estimation/compensation unit ME/MC 46, and a discrete cosine transform/quantization unit DCT/Q 48. The respective units 42, 44, 46, 48 are each connected to a local bus 49. Each of the processing units 42, 46, 48 sends data to, and retrieves data from, an external frame memory SDRAM 32. The data exchange is controlled by a memory controller 44 that is connected to the local bus 49 and is under the control of the CPU 42.

A conventional design for the video data compressor 40 in the mobile system commonly takes the form of hardwired circuits and software programs functioning on an operating system. For example, referring back to FIG. 1, the function of the rate control circuit 12 and the VLC 14 of FIG. 1 can be performed by a software program hosted on the CPU 42, while the function of the ME/MC 46 and the DCT/Q 48 of FIG. 2 can be constructed of specialized hardwired circuits.

The operational frequency of the local bus 49 in the mobile system 30 is determined according to the memory bandwidth required by each of the various processing units 42, 46, 48, wherein the memory bandwidth refers to the amount of bus time required in bits per second for each of the units 42, 46, 48 to communicate with memory 32, and further by the operational frequency of the CPU 42. The power consumption of the video data compressor 30 is in turn a function of the operational frequency of the local bus 49.

The conventional mobile system 30 includes an external frame memory SDRAM 32 connected to the local bus 49. One way to reduce power consumption in the frame memory is to embed the frame memory into the circuit of the video data compressor as a single integrated circuit; however, it is difficult to integrate such a large amount of memory into a single circuit. Since each processing unit 46, 48 exchanges data with the external frame memory SDRAM 32 via the local bus 49, the operational frequency of the local bus 49 is necessarily high in the video data compressor 40.

Table 1 shows the number of memory bytes located in external memory that are accessed by each processing block. In this example, a search window for a motion vector is assumed to be fcode=1(−16~+15.5). The fcode parameter is defined in the MPEG standard for motion compensation and defines the maximum size of the search range.

Following computation of the difference macro block, the DCT/quantization unit 48 reads the motion compensated macro block from memory 32 as 8*8*6=384 bytes of data, as shown in step (8) of Table 1, and performs transformation and quantization of the data, as explained above. Following the DCT operation, the amount of data, or data bandwidth, increases by one and one-half times, for example, if the input data is 8 bits wide, then the output data is 12 bits wide. The output of the DCT are quantized by the quantization Q unit (see unit 10 of FIG. 1), and the quantized coefficients are

TABLE 1

| Processing block | Function requiring video data | Amount of data (bytes) |
| --- | --- | --- |
| Motion Estimation (ME) | (1) Current macro block read (1) | 16 × 16 = 256 |
| | (2) Search window read (2) | 48 × 48 = 2304 |
| Motion Compensation (MC) | (3) Current Cb block read (3) | 8 × 8 = 64 |
| | (4) Current Cr block read (4) | 8 × 8 = 64 |
| | (5) Previous Cb block read (5) | 9 × 9 = 81 |
| | (6) Previous Cr block read (6) | 9 × 9 = 81 |
| | (7) Motion compensated macro block write | 8 × 8 × 6 = 384 |
| Discrete Cosine Transform (DCT) | (8) Motion compensated macro block read | 8 × 8 × 6 = 384 |
| | (9) Quantized coefficient write | 8 × 8 × 6 × 1.5 = 576 |
| Inverse Quantization/ Inverse DCT | (10) Quantized coefficient read | 8 × 8 × 6 × 1.5 = 576 |
| | (11) Reconstructed error image write | 8 × 8 × 6 = 384 |
| Motion Compensation (MC) | (12) Previous Y blocks read | 17 × 17 = 289 |
| | (13) Previous Cb blocks read | 9 × 9 = 81 |
| | (14) Previous Cr blocks read | 9 × 9 = 81 |
| Reconstruction | (15) Reconstructed error image read | 8 × 8 × 6 = 384 |
| | (16) Reconstructed image write (16) | 8 × 8 × 6 = 384 |
| Total | | 6373 |

Each data frame includes a number of macro blocks, and each macro block includes 2×2 luminance blocks Y, each luminance block Y comprising 8×8 pixels, and two chrominance blocks, i.e., one is for chrominance blue Cb and the other is for chrominance red Cr. Each chrominance block comprises 8×8 pixels.

When motion estimation is performed by the motion estimation ME unit 46 of FIG. 2, only the luminance blocks are used, therefore the amount of the data read from memory 32 during the retrieval of a current luminance macro block is 256 bytes, i.e., 16*16=256, as shown in step (1) of Table 1. At step (2), the search window for the motion vector is next read from the memory 32, and the amount of data read is 48*48=2304 bytes (assuming fcode=1).

After the motion vector is determined by the motion estimation ME unit, the motion compensation unit MC reads from memory 32 the two previous blocks (chrominance blue Cb and chrominance red Cr) which are best matched with the current blocks, each read block of the previous blocks including 9*9=81 bytes of pixel data, as shown in steps (5) and (6) of Table 1. In addition, the current chrominance block blue Cb and current chrominance block red Cr are also read from memory 32, each including 8*8=64 bytes of data, as shown in steps (3) and (4) of Table 1. A difference macro block (referred to as the "motion compensated macro block") between the current macro block (4 blocks for luminance and 2 blocks for chrominance) and previous macro block (4 blocks for luminance and 2 blocks for chrominance) is then computed by the subtraction circuit 6 (see FIG. 1) and is written to memory 32, as 8*8*6=384 bytes of data, as shown in step (7) of Table 1.

written to memory 32 as 8*8*6*1.5=576 bytes of data, as shown in step (9) of Table 1.

In addition, generation of the reference macro block for the next frame image is required. Accordingly, the IQ/IDCT unit (see units 18 and 20 of FIG. 1), reads the quantized coefficients from memory 32 as 8*8*6*1.5=576 bytes of data, as shown in step (10) of Table 1, and reconstructs a difference macro block. The reconstructed difference macro block is stored in memory 32 as 8*8*6=384 bytes of data, as shown in step (11) of Table 1.

The motion compensation MC unit 46 (see also unit 26 of FIG. 1) next reads from memory 32 the previous macro block from memory 32, the previous macro block including two luminance blocks of 17*17=289 bytes of data, as shown in step (12) of Table 1, and two chrominance blocks, each of 9*9=81 bytes of data, as shown in steps (13) and (14) of Table 1. The previous macro block is added to the reconstructed error image macro block, which is read from memory 32 as 8*8*6 bytes of data, as shown in step (15) of Table 1. The reconstructed image macro block, which is used as a "previous" block for the following frame, is then stored in memory 32 as shown in step (16) of Table 1.

As described above, the conventional video compressor relies heavily on the common local bus 49 and the external frame memory 32 and requires, in inter-mode operation, two motion compensation processes per iteration; one for data compression and the other for reconstruction. The required operational frequency of the local bus 49 is therefore high, because all procedures for data compression are performed in a pipelined system, with each step consuming local bus 49 bandwidth, as shown above in Table 1. The amount of power consumed by the frequent reading from and writing to external memory as shown in this example, is not suitable for efficient operation in mobile systems.

SUMMARY OF THE INVENTION

The present invention is directed to a system and method that perform video data compression in a manner that limits the need for external memory access. Accordingly, the operational frequency of the local bus is reduced and power consumption is minimized. Therefore, the present invention is especially amenable to use in mobile systems.

In a first aspect, the present invention is directed to a video data compression unit. The unit comprises a motion estimation processor for receiving current video data from a data bus and for generating differential video data based on a difference between the current video data and reference video data. A transform coder receives the differential video data directly from the motion estimation processor and transforms the differential video data from the spatial domain to the frequency domain to generate transformed video data. A local memory stores the transformed video data.

In one embodiment, the transform coder receives the differential video data directly from the motion estimation processor, independent of the data bus. The transformed video data can be written directly to the local memory for storage, independent of the data bus. The transform coder further retrieves the transformed video data from the local memory and inverse-transforms the transformed video data from the frequency domain to the spatial domain to generate inverse-transformed video data.

The transform coder optionally comprises a discrete-cosine transform (DCT) unit for transforming the differential video data from the spatial domain to the frequency domain to generate transformed differential video data; and an inverse-discrete-cosine transform (IDCT) unit for inverse-transforming the transformed video data stored in the local memory from the frequency domain to the spatial domain. The discrete-cosine transform unit receives the differential video data directly from the motion estimation processor, independent of the data bus. The discrete-cosine transform unit performs the transforming operation on the differential video data as segments of the differential video data which are generated by the motion estimation processor, such that the discrete-cosine transform unit and the motion estimation processor operate contemporaneously on the differential video data.

The transform coder optionally further comprises a quantization unit for quantizing the transformed differential video data output by the discrete-cosine transform (DCT) unit to generate the transformed video data; and an inverse quantization unit for inverse-quantizing the transformed video data stored in local memory, an output of which is provided to the inverse discrete-cosine-transform unit. The quantization unit receives the transformed differential video data directly from the discrete-cosine transform unit, independent of the data bus. The inverse quantization unit receives the transformed video data directly from the local memory, independent of the data bus. The inverse-discrete-cosine transform unit receives the output of the inverse quantization unit as the transformed video data directly from the inverse quantization unit, independent of the data bus.

The transform coder operates in a forward mode and an inverse mode, wherein when in the forward mode of operation, the discrete-cosine-transform unit and the quantization unit are active, and, when in the reverse mode of operation the inverse discrete-cosine-transform unit and the inverse quantization unit are active. The transform coder selects between the forward mode and the inverse mode based on a status of the transform coder mode selection signal. The transform coder mode selection signal is generated in response to a count of transformed video signals processed by the local memory.

The quantization unit performs the quantization operation on the transformed differential video data as segments of the transformed differential video data which are generated by the discrete-cosine transform unit, such that the quantization unit and the discrete-cosine transform unit operate contemporaneously on the transformed differential video data. Similarly, the inverse-discrete-transform unit performs the inverse-transforming operation on the video data output of the inverse quantization unit as segments of the output data of the inverse quantization unit are generated by the inverse quantization unit, such that the inverse-discrete-transform unit and the quantization unit operate contemporaneously on the output data of the inverse quantization unit.

The motion estimation processor comprises a motion estimation unit for generating a motion vector based on the current video data and the reference video data; a mode decision unit for determining a mode of operation based on the motion vector, the mode of operation being one of an intra-mode and an inter-mode; and a motion compensation unit for generating the differential data based on the determined mode of operation, such that when the mode of operation is the intra-mode, the current video data is output by the motion estimation processor as the differential video data, and such that when the mode of operation is the inter-mode, the differential data is generated by the motion compensation unit based on the difference between the current video data and the reference video data.

A composer is provided for combining the inverse-transformed video data and the reference video data, and for outputting the combined data as reconstructed video data. When the mode of operation is the inter-mode, the reference video data is stored in the local memory and the composer receives the reference video data directly from the local memory, independent of the data bus. The composer optionally receives the inverse-transformed video data directly from the transform coder, independent of the data bus. The reconstructed video data is output to the data bus, wherein the reconstructed video data from a previous frame is used as the reference video data for a subsequent frame.

An output unit may be provided for processing the transformed video data and for outputting the transformed video data as compressed video data. The output unit comprises, for example, a zig-zag scanning unit and a variable-length coding (VLC) unit for statistical reduction of the transformed data.

The local memory comprises, for example, a first local memory for storing the current video data and reference video data received from the data bus and for storing reconstructed video data generated by a composer based on the transformed video data and the reference video data to be output to the data bus; a second local memory for storing the reference video data for access by the composer; and a third local memory for storing the transformed video data output by the transform coder.

A DMA controller may further be provided for retrieving the current video data and the reference video data from the data bus for storage in the first local memory and for transmitting the reconstructed video data from the first local memory to the data bus.

In another aspect, the present invention is directed to a video data compression system. The system includes a processing unit coupled to a data bus. A memory controller is coupled between the data bus and external memory. A video data core unit is also provided. The video data core unit includes a motion estimation processor for receiving current video data from the data bus and for generating differential video data based on a difference between the current video data and reference video data. A transform coder receives the differential video data directly from the motion estimation processor and transforms the differential video data from the spatial domain to the frequency domain to generate transformed video data. A local memory stores the transformed video data.

In another aspect, the present invention is directed to a method for compressing video data. Current video data is received from a data bus and differential video data is generated based on a difference between the current video data and reference video data. The differential video data is received directly by a transform coder and transformed from the spatial domain to the frequency domain to generate transformed video data. The transformed video data is then stored in local memory.

BRIEF DESCRIPTION OF THE DRAWINGS

The foregoing and other objects, features and advantages of the invention will be apparent from the more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF PREFERRED EMBODIMENTS

Figure 3:
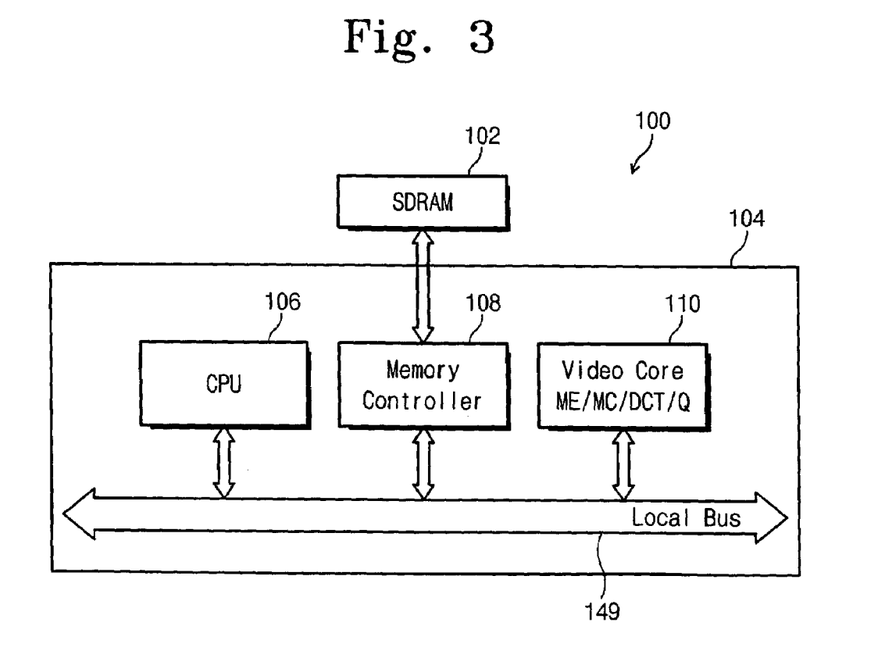
FIG. 3 is a block diagram of a mobile system according to the present invention.

FIG. 3 is a block diagram of a mobile system 100 including a video data compressor 104 according to the present invention. The mobile system 100 includes an external memory 102, for example SDRAM 102, and a video data compressor 104. The video data compressor 104 is, for example, constructed as a system on a chip and includes a central processing unit (CPU) 106, a video core 110, an external memory controller 108 and a local bus. The video core 110 reads data from and writes data to the external memory 102 via the memory controller 108.

When performing video data compression, the video core 110 processes data one macro block row at a time, or optionally one frame at a time, depending on the data bandwidth available on the local bus, as provided by the CPU 100.

The mobile system 100 integrates the motion compensation MC, motion estimation ME, discrete cosine transform DCT (and inverse discrete cosine transform (IDCT)) and quantization Q function blocks into a single chip. The amount of consumed circuit area is thus smaller than in the conventional system. In addition, because local memory (see, for example, memory 118, 122 and 130 of FIG. 4) are embedded in the video data core 110, certain data elements can be passed directly between function blocks, and therefore the number of accesses to external memory 102 over the local bus 149, i.e. the operational bandwidth, is greatly reduced. Therefore, the power consumption of the mobile system is likewise reduced.

Figure 4:
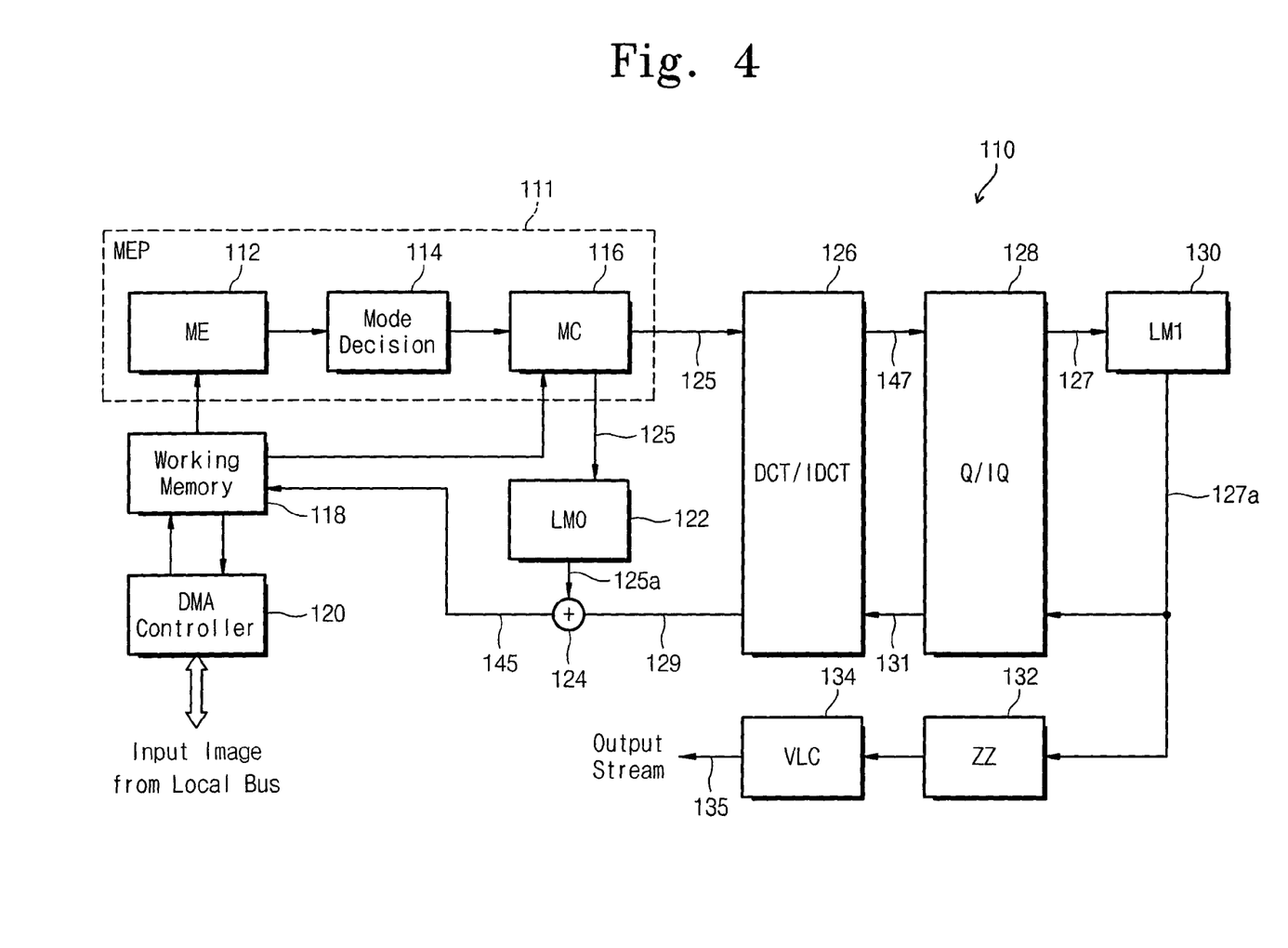
FIG. 4 is a functional block diagram of a video data compressor in accordance with a preferred embodiment of the present invention.

Referring to FIG. 4, the video core 110 of the present invention includes a motion estimation processor MEP 111, three local memory units 118, 122, and 130, a discrete cosine transform (DCT)/inverse discrete cosine transform (IDCT) unit 126, a quantization/inverse quantization unit 128, a direct memory access controller (DMA) 120, a zig-zag scanning unit ZZ 132 and a variable length coder 134. The zig-zag scanning unit 132 is part of an output unit along with the variable length coder 134, and operates according to conventional means to produce an output data stream 135.

The three local memory units comprise a working memory 118, a first local memory LM0 122 and a second local memory LM1 130. In one example, the size of the working memory is 768×32 bits, the first local memory is LM0 is 384×8 bits in size, and the second local memory LM1 is 384×9 bits in size. The sizes of the various memory units 118, 122, 130 may vary, depending on application requirements.

The motion estimation processor MEP 111 comprises a motion estimation ME unit 112, mode decision unit 114, and a motion compensation MC unit 116. The motion estimation ME unit 112 generates a motion vector based on the current macro block and reference macro block. A mode decision is reached by the mode decision unit 114 based on the motion vector. Particularly, the mode decision unit 114 determines whether the video core is to operate in intra-mode, or inter-mode. Assuming operation in inter-mode, motion compensation is then performed by the motion compensation unit MC 116, which receives the motion vector generated by the motion estimation ME unit 112. In this case, the motion compensation 116 unit produces a differential macro block that is representative of the difference between a current macro block and a previous reconstructed macro block following determination of a motion vector. Assuming intra-mode, motion compensation is not performed.

Figure 7:
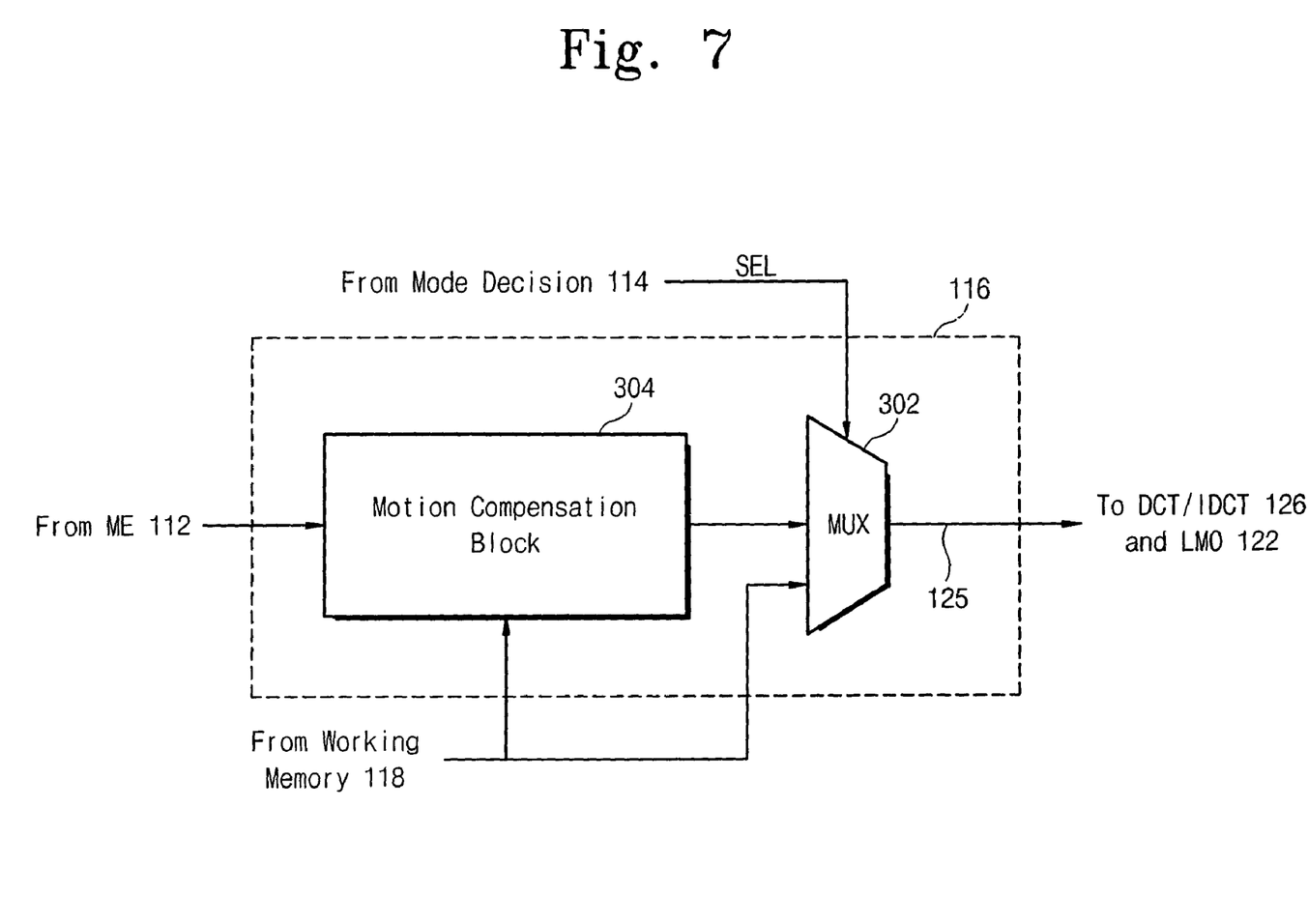
FIG. 7 is a detailed block diagram of an embodiment of the motion compensation unit of FIG. 4, in accordance with the present invention.

FIG. 7 is a detailed block diagram of an embodiment of the motion compensation unit of FIG. 4, in accordance with the present invention. As stated above, the mode decision unit 114 reaches a decision as to whether the video core is to operate in inter-mode or intra-mode. In intra-mode, the mode decision unit 114 outputs a selection signal SEL that is applied to a multiplexer 302 for selecting input data that is received from working memory 118. In inter-mode, the mode decision unit 114 outputs the selection signal SEL that is applied to the multiplexer 302 for selecting input data that is received from a motion compensation block 304 responsible for generating differential data based on the motion vector received from the motion estimation ME block 112 and based on the input data received from working memory 118. The data selected at the multiplexer according to the selection signal is then provided as data 125 to the DCT/IDCT unit 126 and to the first local memory LM0.

Detailed functionality of the video core 110 will now be described. A current macro block and related search window blocks are transferred via the local bus (see 149 of FIG. 3), and are stored in the working memory 118 by the memory controller 120. Assuming the parameters of the example given above, the luminance macro block is read as 16*16=256 bytes of data (see step (1) of Table 2 below) and the search window is also read as 48*48=2304 bytes of data (see step (2) of Table 2 below) The motion estimation unit ME 112 reads the current macro block from the working memory 118 and search window blocks from the working memory 118 and determines the motion vector of the current macro block. The mode decision unit 114 determines the operation mode for video data compression; for example, whether the mode is inter-mode or intra-mode.

As explained above, when in the inter-mode, motion compensation is performed by the motion compensation unit MC 116 in the motion estimation processor MEP 111. In inter-mode, the motion estimation unit ME 112 determines the motion vector associated with the current macro block. The motion compensation unit MC 116 reads the current macro block and a reconstructed previous macro block from the working memory 118 and performs motion compensation using the motion vector obtained from the motion estimation unit ME 112. In doing so, the motion compensation unit 116 reads the current chrominance block blue Cb and the current chrominance block red Cr from working memory as 8*8=64 bytes of data each, while the previous chrominance block blue Cb and the previous chrominance block red Cr are read as 9*9=81 bytes each, as shown in steps (3) through (6) of Table 2 below. As a result of the motion compensation process, differential macro block data 125 is generated representing the difference between the current macro block and the previous motion-compensated macro block. The differential macro block data 125 is then provided to the discrete cosine transform/inverse discrete cosine transform unit DCT/IDCT 126. At the same time, the differential macro block data 125 is stored in the first local memory LM0 122. Note that in this embodiment, the differential macro block data is not written to external memory, thus preserving local bus bandwidth, and reducing power consumption.

Alternatively, when in the intra-mode, motion compensation is not performed in the MEP 111, that is, the current macro block is provided directly to the DCT/IDCT unit.

The DCT/IDCT unit 126 and the quantization/inverse quantization unit Q/IQ 128 are, for example, constructed of single units respectively. Whether the units 126, 128 operate in a forward mode of operation (DCT and Q) or an inverse mode of operation (IDCT and IQ) is controlled by operation control logic, described in further detail below with reference to FIG. 6. The DCT and IDCT can perform as a single unit, therefore an unified block for the DCT and IDCT operations can be more efficient than two separate units, particularly where circuit area consumption is of primary concern. This same condition also applies to the Q and IQ operations.

According to the present invention, the differential macro block 125 provided by the motion compensation unit MC 116 is processed by the forward discrete cosine transform unit DCT 126 to generate forward transformed data 147, which is in turn processed by the forward quantization unit Q 128. The resulting transformed and quantized data 127 is stored, for example, in the second local memory LM1 130. Again, in this case, the data 147, 127 are passed between units 126, 128 and local memory 130 without the need for external memory access via the local bus. Inverse quantization IQ and inverse discrete cosine transform IDCT operations are performed sequentially on the transformed and quantized data 127 after the operation mode of the units 126, 128 is changed from forward to reverse by the operation control logic (see FIG. 6).

The quantization/inverse quantization unit Q/IQ 128 receives a quantization rate control signal from the CPU 106 through the local bus. The quantization rate may alternatively be determined by quantization rate control logic which receives the size of the video data and a target bit rate from the CPU 106.

Following inverse quantization at the IQ unit 128, first inverse-quantized data 131 is generated. The inverse-quantized data 131 is provided to the inverse discrete cosine transform unit 126, which generates inverse-discrete-cosine-transformed data 129. The inverse-discrete-cosine-transformed data is added to the differential macro block data 125*a* stored in the first local memory LM0 122 at composer 124, and the added data 145 is stored in working memory 118. Again, in this case, the data 127*a*, 131, 129, 125*a* are passed between units 130, 128, 126, 124, 118 without the need for external memory access via the local bus 149. The stored added data 145 is then restored to external frame memory by the memory controller 120 as 8*8*6=384 bytes of data, as shown in step (7) of Table 2 below, to be used as the reconstructed previous macro block for the following frame data.

The variable length coder unit VLC 134 also receives the transformed and quantized macro block data 127*a* from the second local memory LM1 130 via the zig-zag scanning unit 132, and outputs a coded bit stream 135, following statistical reduction of the size of the data. The statistical method for reducing the size of the data may, for example, comprise the Huffman coding method.

In this manner, the system and process of the present invention completes an iteration of video data compression, while limiting the need for access to the external memory via the local bus 149. In this case, access is limited to the transfer of 3234 bytes, as compared to 6373 bytes under the conventional system. The difference in access volume in this illustrative example, lies in that external access at steps (7) through (15) of Table 1, required in the conventional embodiment (shown in bold and italicized in Table 1), are not necessary in the system and process of the present invention.

Figure 5:
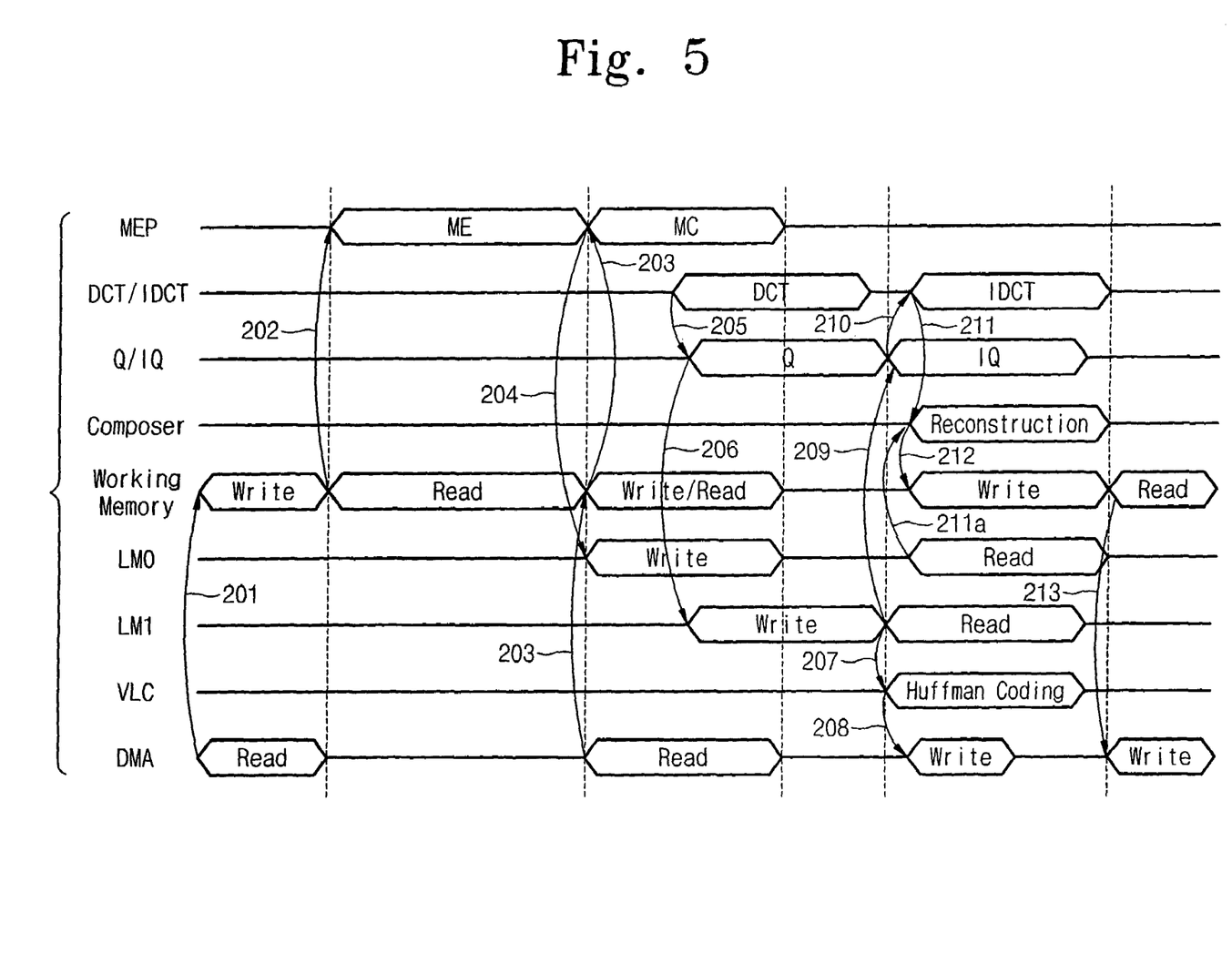
FIG. 5 is a timing diagram for describing operation of the video data compressor of FIG. 4

FIG. 5 is a timing diagram for illustrating the timing of the exchange of data in the video core 110 of FIG. 4. Referring to FIGS. 4 and 5, at step 201, the video core 110 retrieves the current macro block and the search window blocks using the DMA memory controller 120, and writes them to working memory 118. The motion estimator unit ME 112 retrieves the current macro block and search window blocks from the working memory 118 at step 202 and determines the motion vector, and the mode decision unit 114 determines the mode of operation between the intra-mode and inter-mode. Assuming the operation mode to be inter-mode, the motion compensation unit MC 116, at step 203, retrieves the current chrominance blue Cb and chrominance red Cr blocks and previous chrominance blue Cb and chrominance red Cr blocks from the working memory 118 or external frame memory via the memory controller 120, and produces the differential macro block data 125. The differential macro block data 125 is stored in the first local memory 122 at step 204.

At the same time, the differential macro block data is input to the DCT/IDCT unit 126. In a preferred embodiment, the DCT/IDCT unit 126 initiates discrete cosine transformation when the first differential macro block data of a pixel row is generated by the motion compensation unit MC 116.

Similarly, the quantization unit Q 128 initiates the quantization process when the first DCT coefficient is generated as shown at step 205. The quantized output data 127 is then stored in the second local memory LM1 130, as shown in step 206.

At step 207, the quantized output data 127a are read from the second local memory by the variable length coding unit VLC 134. The coded data, for example, in the form of a bit stream 135 are then supplied to the data channel or apparatus receiving the stream. Alternatively, in step 208, the coded data 135 can be stored in the external frame memory via the memory controller 120.

When all quantized coefficients for the current macro block (for example 384 bytes) are stored in the second local memory LM1 130, the video data compressor 110 changes the mode of operation of the DCT/IDCT and Q/IQ units 126, 128 from the forward mode (i.e. data compression) to the inverse, or reverse, mode (i.e. data decompression). When the mode is changed to inverse mode, the quantized coefficients 127a for the current macro block are read from the second local memory 130 by the inverse quantization unit IQ 128 at step 209 and the inverse quantization process begins. At generation of the first inverse-quantized data 131, the inverse-discrete-cosine-transform process begins at IDCT unit 126, as shown at step 210. The inverse-discrete-cosine-transformed data 129 are then transferred to the composer 124 at step 211, where they are added to the reference macro block that was previously stored in the first local memory LM0 122, as shown at step 211a. The added data 145 is stored in working memory 118 at step 212, and eventually restored to the external frame memory by the memory controller 120, as shown at step 213, to be used as the reconstructed previous macro block for the following frame data.

Figure 6:
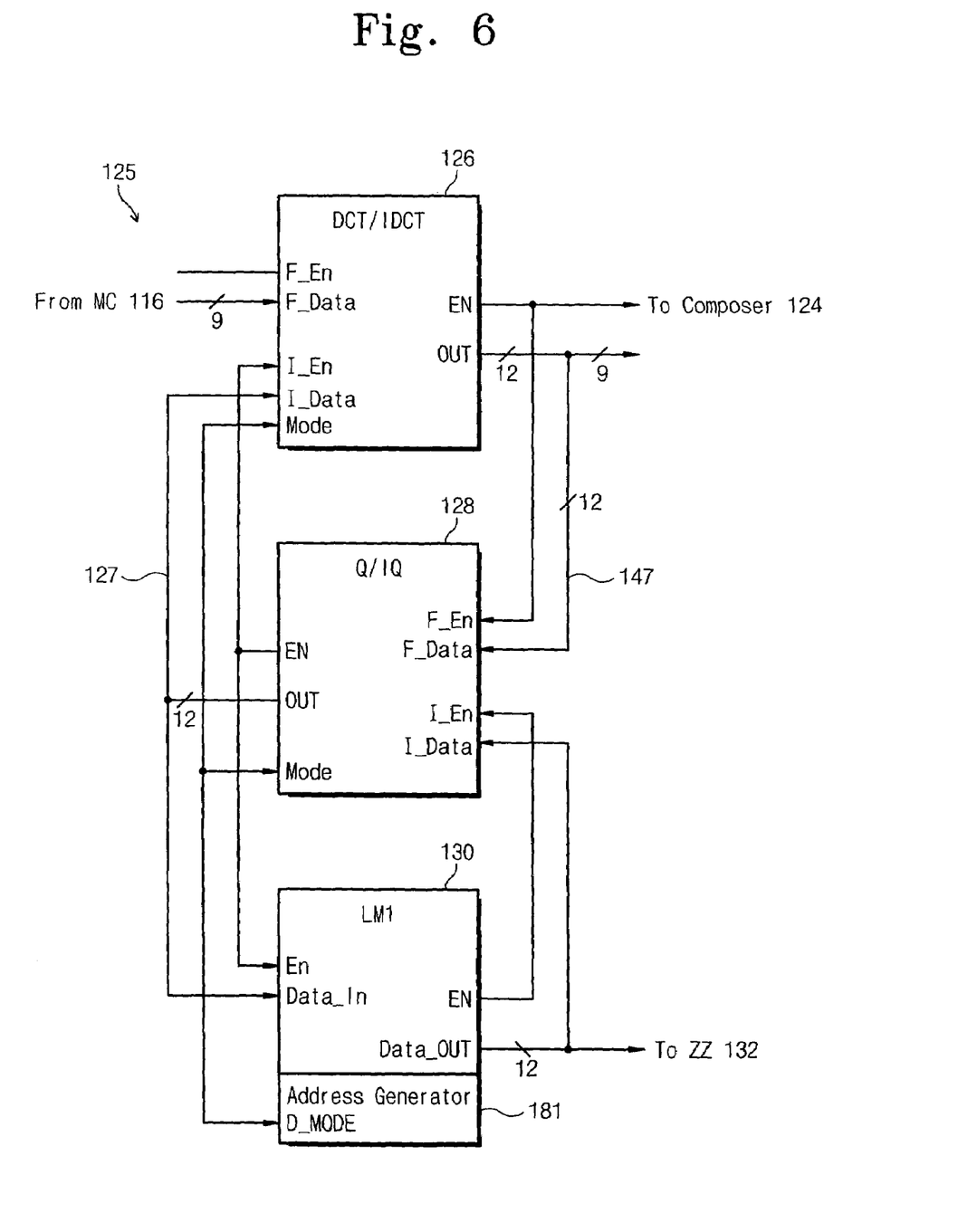
FIG. 6 is a circuit block diagram of a circuit for alternately activating the forward and reverse discrete cosine transform units and the forward and reverse quantization units.

FIG. 6 is a circuit block diagram of an embodiment of the forward/reverse mode control circuitry. In this embodiment, the discrete cosine transform/inverse discrete cosine transform unit DCT/IDCT 126, and the quantization/inverse quantization unit Q/IQ 128 each receive a mode signal MODE that is generated by an address generator unit 181. In the forward mode of operation, differential macro block data 125 from the motion compensation unit 116 are received via the DCT/IDCT unit inputs F_En, F_Data, the data are processed, and the resulting output data 147 are transferred to the Q/IQ unit 128. Similarly, the Q/IQ unit 128 inputs F_En, F_Data receive the DCT output data 147 and the quantized output data 127 are transferred to the second local memory 130. The second local memory 130 includes mode control logic 181 that generates an address for the local memory to store data to or retrieve data from. The mode control logic counts the number of data elements in the quantized macro block that are stored in memory. When the count reaches a predetermined number, for example 384 in the present example, it is determined that all quantized data have been written to memory, and the mode is thus changed from forward to inverse. In inverse mode, the D_Mode signal, generated by the mode control logic 181 is toggled and the quantized data stored in the second local memory LM1 130 are transferred in a reverse direction to the IQ unit 128 and the IDCT unit 126. As the quantized data are retrieved from local memory 130, the mode control logic again counts the number of data bytes read until the predetermined number is again reached, in which case the mode is reverted to the forward mode.

Table 2, below, provides an example of the number of accesses of external memory via the local bus per iteration of video data compression by the video core 110 of the present invention, while in the inter-mode of operation, in terms of bytes of data. The example of Table 2 assumes the same macro blocks data structure as that assumed in Table 1 above. The size of the search window blocks for generating the motion vector in the motion estimation unit ME 112 is once again assumed to be fcode=1(−16~+15.5)

TABLE 2

| Processing unit | Function requiring video data | Amount of the data (bytes) |
|---|---|---|
| ME | (1) Current macro block read | 16 × 16 = 256 |
|  | (2) Search window read | 48 × 48 = 2304 |
| MC | (3) Current Cb block read | 8 × 8 = 64 |
|  | (4) Current Cr block read | 8 × 8 = 64 |
|  | (5) Previous Cb block read | 9 × 9 = 81 |
|  | (6) Previous Cr block read | 9 × 9 = 81 |
| Reconstructed | (7) Reconstructed macro block write | 8 × 8 × 6 = 384 |
| Total |  | 3234 |

As described above, each processing unit in the video core 110 according to the invention, for example, the motion estimation unit ME 112, the motion compensation unit MC 116, the discrete cosine transformation unit DCT 126, and the quantization unit Q 128, has a direct inter-unit data interface path. As a result, the respective units do not need to access external memory in order to receive and transmit data. To provide for the direct data interface that is independent of external memory, the video data compressor 110 of the present invention includes three internal memory units, that is, the working memory 118, first local memory 122 and second local memory 130.

In addition, since the result of the first motion compensation procedure is stored as the differential macro block data in the first local memory LM0 122, the video data compressor 110 does not need to access external memory to retrieve it when the second motion compensation procedure is performed. This is in comparison to the conventional approach, in which external memory is accessed both during the first motion compensation procedure (see steps (3), (4), (5), (6), and (7) of Table 1), and also during the second motion compensation procedure (see steps (12), (13) and (14) of Table 1).

As a result, comparing the frequency and volume of external memory access of the conventional embodiment as shown in Table 1 with the frequency and volume of external memory access of the embodiment of the present invention described above as shown in Table 2, the video data compressor according to the present invention provides for a drastic reduction in the requirement for external memory access.

As described above, in a preferred embodiment of the present invention, the DCT and IDCT functions are combined in a single unit, and the quantization Q and the inverse quantization IQ functions are combined in a single unit. Forward/reverse mode control circuitry toggles the mode between forward and reverse, as needed. This reduces the amount of circuit area consumed by these functions.

In this manner, the video data compressor system according to the present invention, reduces the number of external memory accesses, in terms of bytes, by a significant amount. As a result the required operational frequency of the local bus is relatively low, making the system and method of the present invention well suited for mobile systems.

While this invention has been particularly shown and described with references to preferred embodiments thereof, it will be understood by those skilled in the art that various changes in form and details may be made herein without departing from the spirit and scope of the invention as defined by the appended claims.

What is claimed is:

1. A video data compression unit comprising:
   a motion estimation processor for receiving current video data from a data bus and for generating differential video data based on a difference between the current video data and reference video data;
   a transform coder receiving the differential video data directly from the motion estimation processor and for transforming the differential video data from the spatial domain to the frequency domain to generate transformed video data; and
   a local memory for storing the transformed video data and for storing the differential video data generated by, and received from, the motion estimation processor.

2. The video data compression unit of claim 1 wherein the transform coder receives the differential video data directly from the motion estimation processor, independent of the data bus.

3. The video data compression unit of claim 1 wherein the transformed video data is written directly to the local memory for storage, independent of the data bus.

4. The video data compression unit of claim 1 wherein the transform coder further retrieves the transformed video data from the local memory and inverse-transforms the transformed video data from the frequency domain to the spatial domain to generate inverse-transformed video data.

5. The video data compression unit of claim 4 wherein the transform coder comprises:
   a discrete-cosine transform (DCT) unit for transforming the differential video data from the spatial domain to the frequency domain to generate transformed differential video data; and
   an inverse-discrete-cosine transform (IDCT) unit for inverse-transforming the transformed video data stored in the local memory from the frequency domain to the spatial domain.

6. The video data compression unit of claim 5 wherein the discrete-cosine transform unit receives the differential video data directly from the motion estimation processor, independent of the data bus.

7. The video data compression unit of claim 5 wherein the discrete-cosine transform unit performs the transforming operation on the differential video data as segments of the differential video data are generated by the motion estimation processor, such that the discrete-cosine transform unit and the motion estimation processor operate contemporaneously on the differential video data.

8. The video data compression unit of claim 5 wherein the transform coder further comprises:
   a quantization unit for quantizing the transformed differential video data output by the discrete-cosine transform (DCT) unit to generate the transformed video data; and
   an inverse quantization unit for inverse-quantizing the transformed video data stored in local memory, an output of which is provided to the inverse discrete-cosine-transform unit.

9. The video data compression unit of claim 8 wherein the quantization unit receives the transformed differential video data directly from the discrete-cosine transform unit, independent of the data bus.

10. The video data compression unit of claim 8 wherein the inverse quantization unit receives the transformed video data directly from the local memory, independent of the data bus.

11. The video data compression unit of claim 8 wherein the inverse-discrete-cosine transform unit receives the output of the inverse quantization unit as the transformed video data directly from the inverse quantization unit, independent of the data bus.

12. The video data compression unit of claim 8 wherein the transform coder operates in a forward mode and an inverse mode, wherein when in the forward mode of operation, the discrete-cosine-transform unit and the quantization unit are active, and, when in the reverse mode of operation the inverse discrete-cosine-transform unit and the inverse quantization unit are active.

13. The video data compression unit of claim 12 wherein the transform coder selects between the forward mode and the inverse mode based on a status of the transform coder mode selection signal.

14. The video data compression unit of claim 13 wherein the transform coder mode selection signal is generated in response to a count of transformed video signals processed by the local memory.

15. The video data compression unit of claim 8 wherein the quantization unit performs the quantization operation on the transformed differential video data as segments of the transformed differential video data are generated by the discrete-cosine transform unit, such that the quantization unit and the discrete-cosine transform unit operate contemporaneously on the transformed differential video data.

16. The video data compression unit of claim 8 wherein the inverse-discrete-transform unit performs the inverse-transforming operation on the video data output of the inverse quantization unit as segments of the output data of the inverse quantization unit are generated by the inverse quantization unit, such that the inverse-discrete-transform unit and the quantization unit operate contemporaneously on the output data of the inverse quantization unit.

17. The video data compression unit of claim 4 wherein the motion estimation processor comprises:
   a motion estimation unit for generating a motion vector based on the current video data and the reference video data;
   a mode decision unit for determining a mode of operation based on the motion vector, the mode of operation being one of an intra-mode and an inter-mode; and
   a motion compensation unit for generating the differential data based on the determined mode of operation, such that when the mode of operation is the intra-mode, the current video data is output by the motion estimation processor as the differential video data, and such that when the mode of operation is the inter-mode, the differential data is generated by the motion compensation unit based on the difference between the current video data and the reference video data.

18. The video data compression unit of claim 17 further comprising a composer for combining the inverse-transformed video data and the reference video data, and for outputting the combined data as reconstructed video data.

19. The video data compression unit of claim 18 wherein, when the mode of operation is the inter-mode, the reference video data is stored in the local memory and wherein the composer receives the reference video data directly from the local memory, independent of the data bus.

20. The video data compression unit of claim 18 wherein the composer receives the inverse-transformed video data directly from the transform coder, independent of the data bus.

21. The video data compression unit of claim 18 wherein the reconstructed video data is output to the data bus, wherein the reconstructed video data from a previous frame is used as the reference video data for a subsequent frame.

22. The video data compression unit of claim 1 further comprising an output unit for processing the transformed video data and for outputting the transformed video data as compressed video data.

23. The video data compression unit of claim 22 wherein the output unit comprises a zig-zag scanning unit and a variable-length coding (VLC) unit for statistical reduction of the transformed data.

24. The video data compression unit of claim 1 wherein the local memory comprises:
  a first local memory for storing the current video data and reference video data received from the data bus and for storing reconstructed video data generated by a composer based on the transformed video data and the reference video data to be output to the data bus;
  a second local memory for storing the reference video data for access by the composer; and
  a third local memory for storing the transformed video data output by the transform coder.

25. The video data compression unit of claim 24 further comprising a DMA controller for retrieving the current video data and the reference video data from the data bus for storage in the first local memory and for transmitting the reconstructed video data from the first local memory to the data bus.

26. A video data compression system comprising:
  a processing unit coupled to a data bus;
  a memory controller coupled between the data bus and external memory; and
  a video data core unit comprising:
    a motion estimation processor for receiving current video data from the data bus and for generating differential video data based on a difference between the current video data and reference video data;
    a transform coder receiving the differential video data directly from the motion estimation processor and for transforming the differential video data from the spatial domain to the frequency domain to generate transformed video data; and
    a local memory for storing the transformed video data and for storing the differential video data generated by, and received from, the motion estimation processor.

27. The video data compression system of claim 26 wherein the transform coder receives the differential video data directly from the motion estimation processor, independent of the data bus.

28. The video data compression system of claim 26 wherein the transformed video data is written directly to the local memory for storage, independent of the data bus.

29. The video data compression system of claim 26 wherein the transform coder further retrieves the transformed video data from the local memory and inverse-transforms the transformed video data from the frequency domain to the spatial domain to generate inverse-transformed video data.

30. The video data compression system of claim 29 wherein the transform coder comprises:
  a discrete-cosine transform (DCT) unit for transforming the differential video data from the spatial domain to the frequency domain to generate transformed differential video data; and
  an inverse-discrete-cosine transform (IDCT) unit for inverse-transforming the transformed video data stored in the local memory from the frequency domain to the spatial domain.

31. The video data compression system of claim 30 wherein the discrete-cosine transform unit receives the differential video data directly from the motion estimation processor, independent of the data bus.

32. The video data compression system of claim 30 wherein the discrete-cosine transform unit performs the transforming operation on the differential video data as segments of the differential video data are generated by the motion estimation processor, such that the discrete-cosine transform unit and the motion estimation processor operate contemporaneously on the differential video data.

33. The video data compression system of claim 30 wherein the transform coder further comprises:
  a quantization unit for quantizing the transformed differential video data output by the discrete-cosine transform (DCT) unit to generate the transformed video data; and
  an inverse quantization unit for inverse-quantizing the transformed video data stored in local memory, an output of which is provided to the inverse discrete-cosine-transform unit.

34. The video data compression system of claim 33 wherein the quantization unit receives the transformed differential video data directly from the discrete-cosine transform unit, independent of the data bus.

35. The video data compression system of claim 33 wherein the inverse quantization unit receives the transformed video data directly from the Local memory, independent of the data bus.

36. The video data compression system of claim 33 wherein the inverse-discrete-cosine transform unit receives the output of the inverse quantization unit as the transformed video data directly from the inverse quantization unit, independent of the data bus.

37. The video data compression system of claim 33 wherein the transform coder operates in a forward mode and an inverse mode, wherein when in the forward mode of operation, the discrete-cosine-transform unit and the quantization unit are active, and, when in the reverse mode of operation the inverse discrete-cosine-transform unit and the inverse quantization unit are active.

38. The video data compression system of claim 37 wherein the transform coder selects between the forward mode and the inverse mode based on a status of the transform coder mode selection signal.

39. The video data compression system of claim 38 wherein the transform coder mode selection signal is generated in response to a count of transformed video signals processed by the local memory.

40. The video data compression system of claim 33 wherein the quantization unit performs the quantization operation on the transformed differential video data as segments of the transformed differential video data are generated by the discrete-cosine transform unit, such that the quantization unit and the discrete-cosine transform unit operate contemporaneously on the transformed differential video data.

41. The video data compression system of claim 33 wherein the inverse-discrete-transform unit performs the inverse-transforming operation on the video data output of the inverse quantization unit as segments of the output data of the inverse quantization unit are generated by the inverse quantization unit, such that the inverse-discrete-transform unit and the quantization unit operate contemporaneously on the output data of the inverse quantization unit.

42. The video data compression system of claim 29 wherein the motion estimation processor comprises:
   a motion estimation unit for generating a motion vector based on the current video data and the reference video data;
   a mode decision unit for determining a mode of operation based on the motion vector, the mode of operation being one of an intra-mode and an inter-mode; and
   a motion compensation unit for generating the differential data based on the determined mode of operation, such that when the mode of operation is the intra-mode, the current video data is output by the motion estimation processor as the differential video data, and such that when the mode of operation is the inter-mode, the differential data is generated by the motion compensation unit based on the difference between the current video data and the reference video data.

43. The video data compression system of claim 42 further comprising a composer for combining the inverse-transformed video data and the reference video data, and for outputting the combined data as reconstructed video data.

44. The video data compression system of claim 43 wherein, when the mode of operation is the inter-mode, the reference video data is stored in the local memory and wherein the composer receives the reference video data directly from the local memory, independent of the data bus.

45. The video data compression system of claim 43 wherein the composer receives the inverse-transformed video data directly from the transform coder, independent of the data bus.

46. The video data compression system of claim 43 wherein the reconstructed video data is output to the data bus, wherein the reconstructed video data from a previous cycle is used as the reference video data for a subsequent cycle.

47. The video data compression system of claim 26 further comprising an output unit for processing the transformed video data and for outputting the transformed video data as compressed video data.

48. The video data compression system of claim 47 wherein the output unit comprises a zig-zag scanning unit and a variable-length coding (VLC) unit for statistical reduction of the transformed data.

49. The video data compression system of claim 26 wherein the local memory comprises:
   a first local memory for storing the current video data and reference video data received from the data bus and for storing reconstructed video data generated by a composer based on the transformed video data and the reference video data to be output to the data bus;
   a second local memory for storing the reference video data for access by the composer; and
   a third local memory for storing the transformed video data output by the transform coder.

50. The video data compression unit of claim 49 further comprising a DMA controller for retrieving the current video data and the reference video data from the data bus for storage in the first local memory and for transmitting the reconstructed video data from the first local memory to the data bus.

51. A method for compressing video data comprising:
   receiving current video data from a data bus at a motion estimation processor and generating differential video data based on a difference between the current video data and reference video data;
   receiving the differential video data directly at a transform coder and transforming the differential video data from the spatial domain to the frequency domain to generate transformed video data;
   storing the transformed video data, and storing the differential video data generated by, and received from, the motion estimation processor, in local memory.

52. The method of claim 51 further comprising receiving the differential video data directly from the motion estimation processor, independent of the data bus.

53. The method of claim 51 wherein further comprising writing the transformed video data directly to the local memory for storage, independent of the data bus.

54. The method of claim 51 wherein transforming further comprises retrieving the transformed video data from the local memory and inverse-transforming the transformed video data from the frequency domain to the spatial domain to generate inverse-transformed video data.

55. The method of claim 54 further comprising:
   transforming the differential video data from the spatial domain to the frequency domain using a discrete-cosine transform (DCT) to generate transformed differential video data; and
   inverse-transforming the transformed video data stored in the local memory from the frequency domain to the spatial domain using an inverse-discrete-cosine transform (IDCT).

56. The method of claim 55 further comprising receiving the differential video data directly, independent of the data bus.

57. The method of claim 55 wherein transforming using discrete-cosine transform comprises transforming the differential video data as segments of the differential video data are generated by the motion estimation processor, such that generating differential video data and transforming the differential video data are performed contemporaneously on the differential video data.

58. The method of claim 55 wherein transforming further comprises:
   quantizing, at a quantization unit, the transformed differential video data that is discrete-cosine transformed to generate the transformed video data; and
   inverse-quantizing, at an inverse-quantization unit, the transformed video data stored in local memory prior to inverse discrete-cosine-transforming the data.

59. The method of claim 58 wherein the discrete-cosine transformed data is received directly at the quantization unit, independent of the data bus.

60. The method of claim 58 wherein the transformed video data is received directly by the inverse-quantization unit, independent of the data bus.

61. The method of claim 58 wherein transforming occurs in a forward mode and an inverse mode of operation, wherein when in the forward mode of operation, the discrete-cosine-transform and quantization operations are active, and, when in the reverse mode of operation the inverse discrete-cosine-transform and the inverse quantization operations are active.

62. The method of claim 54 wherein generating differential video data comprises:
generating a motion vector based on the current video data and the reference video data;
determining a mode of operation based on the motion vector, the mode of operation being one of an intra-mode and an inter-mode; and
generating the differential data based on the determined mode of operation, such that when the mode of operation is the intra-mode, the current video data is output as the differential video data, and such that when the mode of operation is the inter-mode, the differential data is generated based on the difference between the current video data and the reference video data.

63. The method of claim 62 further comprising combining the inverse-transformed video data and the reference video data, and outputting the combined data as reconstructed video data.

64. The method of claim 63 wherein, when the mode of operation is the inter-mode, the reference video data is stored in the local memory and wherein the step of combining comprises receiving the reference video data directly from the local memory, independent of the data bus.

65. The method of claim 63 wherein the reconstructed video data is output to the data bus, wherein the reconstructed video data from a previous frame is used as the reference video data for a subsequent frame.

66. The method of claim 51 wherein the local memory comprises:
a first local memory for storing the current video data and reference video data received from the data bus and for storing reconstructed video data generated based on the transformed video data and the reference video data to be output to the data bus;
a second local memory for storing the reference video data; and
a third local memory for storing the transformed video data.

67. A video data compression unit comprising:
a motion estimation processor for receiving current video data from a data bus and for generating differential video data based on a difference between the current video data and reference video data;
a transform coder receiving the differential video data directly from the motion estimation processor and for transforming the differential video data from the spatial domain to the frequency domain to generate transformed video data; and
a local memory for storing the transformed video data, wherein the local memory comprises:
a first local memory for storing the current video data and reference video data received from the data bus and for storing reconstructed video data generated by a composer based on the transformed video data and the reference video data to be output to the data bus;
a second local memory for storing the reference video data for access by the composer; and
a third local memory for storing the transformed video data output by the transform coder.

68. The video data compression unit of claim 67 further comprising a DMA controller for retrieving the current video data and the reference video data from the data bus for storage in the first local memory and for transmitting the reconstructed video data from the first local memory to the data bus.

69. A video data compression system comprising:
a processing unit coupled to a data bus;
a memory controller coupled between the data bus and external memory; and
a video data core unit comprising:
a motion estimation processor for receiving current video data from the data bus and for generating differential video data based on a difference between the current video data and reference video data;
a transform coder receiving the differential video data directly from the motion estimation processor and for transforming the differential video data from the spatial domain to the frequency domain to generate transformed video data; and
a Local memory for storing the transformed video data, wherein the local memory comprises:
a first local memory for storing the current video data and reference video data received from the data bus and for storing reconstructed video data generated by a composer based on the transformed video data and the reference video data to be output to the data bus;
a second local memory for storing the reference video data for access by the composer; and
a third local memory for storing the transformed video data output by the transform coder.

70. The video data compression unit of claim 69 further comprising a DMA controller for retrieving the current video data and the reference video data from the data bus for storage in the first local memory and for transmitting the reconstructed video data from the first local memory to the data bus.

71. A method for compressing video data comprising:
receiving current video data from a data bus at a motion estimation processor and generating differential video data based on a difference between the current video data and reference video data;
receiving the differential video data directly at a transform coder and transforming the differential video data from the spatial domain to the frequency domain to generate transformed video data; and
storing the transformed video data in local memory, wherein the local memory comprises:
a first local memory for storing the current video data and reference video data received from the data bus and for storing reconstructed video data generated based on the transformed video data and the reference video data to be output to the data bus;
a second local memory for storing the reference video data; and
a third local memory for storing the transformed video data.

* * * * *